(No Model.)
A. REGER.
FERTILIZER DISTRIBUTER.
No. 292,852. Patented Feb. 5, 1884.
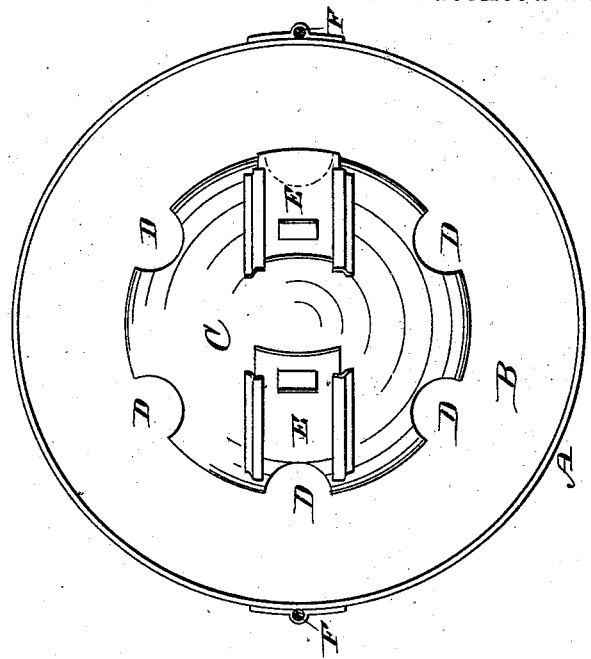
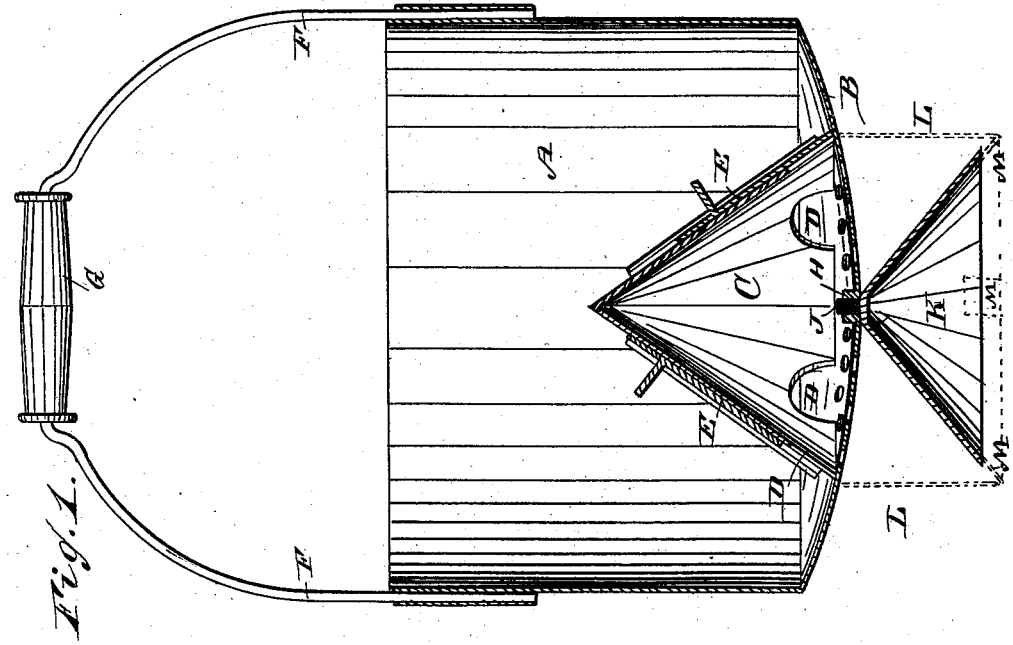
WITNESSES:
Theo. G. Hoster
C. Sedgwick
INVENTOR:
A. Reger
BY Munn & Co
ATTORNEYS.

UNITED STATES PATENT OFFICE.

AUGUSTINE REGER, OF SOMERVILLE, NEW JERSEY.

FERTILIZER-DISTRIBUTER.

SPECIFICATION forming part of Letters Patent No. 292,852, dated February 5, 1884.

Application filed February 27, 1883. (No model.)

*To all whom it may concern:*

Be it known that I, AUGUSTINE REGER, of Somerville, in the county of Somerset and State of New Jersey, have invented a new and Improved Fertilizer-Distributer, of which the following is a full, clear, and exact description.

The object of my invention is to provide a new and improved device for distributing fertilizers, poisonous powders, &c., evenly and regularly, without much labor and without waste of the material.

The invention consists in a pail having a perforated bottom, on which a cover is secured, provided with apertures in its lower edge, through which apertures the fertilizer in the pail escapes to the perforated part of the bottom and drops through the perforations.

The invention also consists in a cone adapted to be secured to the under side of the bottom, with its apex at the bottom of the pail.

Reference is to be had to the accompanying drawings, forming part of this specification, in which similar letters of reference indicate corresponding parts in both figures.

Figure 1 is a longitudinal sectional elevation of my improved fertilizer-distributer. Fig. 2 is a plan view of the same, the bail being shown in section.

A pail, A, is provided with perforations in the middle of its concave bottom B, and above the perforations a hollow cone, C, is secured on the upper surface of the bottom, which cone is provided in its lower edge with a series of recesses forming apertures D. Two of the apertures D, which are preferably diametrically opposite, can be closed by slides E, held on the cone and adapted to slide toward and from the apex of the same. The bail F is securely fastened to the sides of the pail, and is provided with a suitable handle, G. At its middle the bottom is provided with a threaded aperture, H, into which a screw, J, can be screwed, which is secured in the apex of a cone, K, so that the cone will be held below the bottom of the pail with its apex at the said bottom.

The device is used as follows: The pail is filled with the powdered fertilizer, and then the pail is held over the ground on which the fertilizer is to be distributed, and is then quickly turned in alternate directions by means of the handle. The powdered fertilizer passes through the apertures D, upon the perforated part of the bottom, and drops through the perforations to the ground. For each turn of the pail a circle of fertilizer of from three to five inches in diameter is deposited on the ground. The cone C directs the fertilizer to the edges of its bottom, and then it slides down the concave bottom B through the apertures D to the perforated part of the bottom. If a greater quantity of fertilizer is to be distributed, the slides E are raised to open the apertures which they cover. The fertilizer cannot clog or form lumps under the cone, as it immediately drops through the perforations in the bottom. The turning and shaking of the pail breaks all lumps in the fertilizer.

If the fertilizer is to be distributed in a ring around plants or seeds, so that the same will not be burned or otherwise injured by the fertilizer, the cone K is screwed on the bottom of the pail. The fertilizer then drops on the cone K, and is thrown outward by the same, so that it cannot drop onto that part of the ground directly below the cone. Any kind of fertilizer or any poisonous powder for killing bugs and other vermin can be distributed by means of the distributer. Any amount can be distributed without waste. The fertilizer will be dropped and distributed regularly and evenly in any desired place. It can be used to distribute fertilizer to stimulate the growth of plants. It saves labor, and applies the fertilizer better than it can be done by hand. It can be attached to any grain-drill or other planter, and can be rotated in alternate directions by machinery, if desired.

If desired, a band, L, can be secured around the cone K, which band is a short distance from the base of the cone, and projects slightly below the same. The band is held on the cone by means of clips M. The band prevents the fertilizer from being spread too far. The bail F can be lengthened, so that the distributer can be held near the ground, to prevent the wind from blowing off the fertilizer while it is being dropped.

The above-described device can also be used as a flour-sifter.

Having thus described my invention, what I claim as new, and desire to secure by Letters Patent, is—

1. A fertilizer-distributer made substantially as herein shown and described, and consisting of a pail provided with a perforated bottom, over which perforations a cone is fastened, which is provided with apertures in its lower edge, as set forth.

2. In a fertilizer-distributer, the combination, with the pail A, having a concave bottom, B, provided with perforations in the middle, of the cone C, secured on the bottom and provided with apertures D at its lower edge, substantially as herein shown and described, and for the purpose set forth.

3. In a fertilizer-distributer, the combination, with the pail A, having a perforated bottom, of the cone C, having apertures D in its lower edge, and of the slides E, substantially as herein shown and described, and for the purpose set forth.

4. In a fertilizer-distributer, the combination, with the pail A, having a perforated bottom, B, of the cone C, having apertures D at its lower edge, and the cone K, having a screw, J, at its apex, which screw is adapted to be screwed into the bottom of the pail from below, substantially as herein shown and described, and for the purpose set forth.

5. The combination, with the vessel A, having a perforated bottom, of the cone K and the band L, surrounding it, substantially as herein shown and described, and for the purpose set forth.

AUGUSTINE REGER.

Witnesses:
OSCAR F. GUNZ,
C. SEDGWICK.